May 9, 1961  H. A. SYGNATOR  2,983,180
DIE NUT HAVING AN APERTURE SHAPED AS A REGULAR POLYGON
Filed Aug. 7, 1957
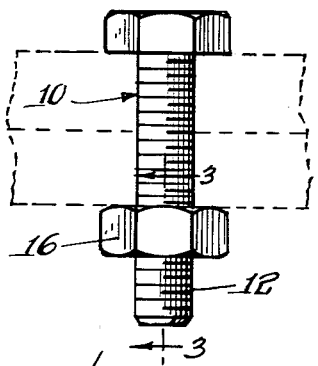
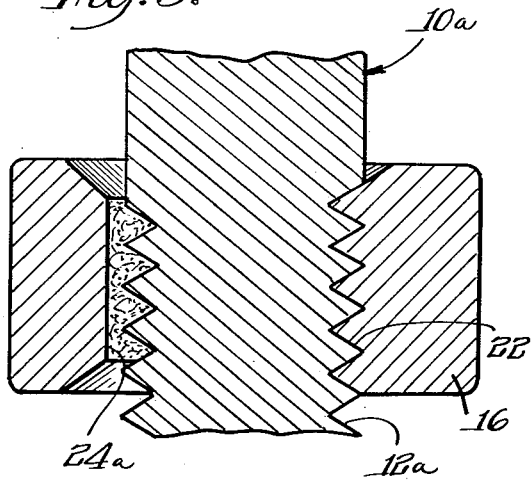
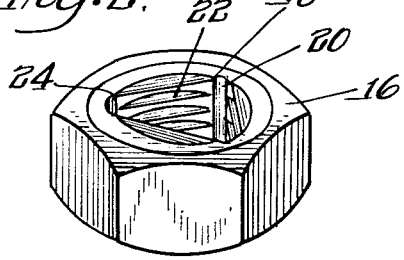
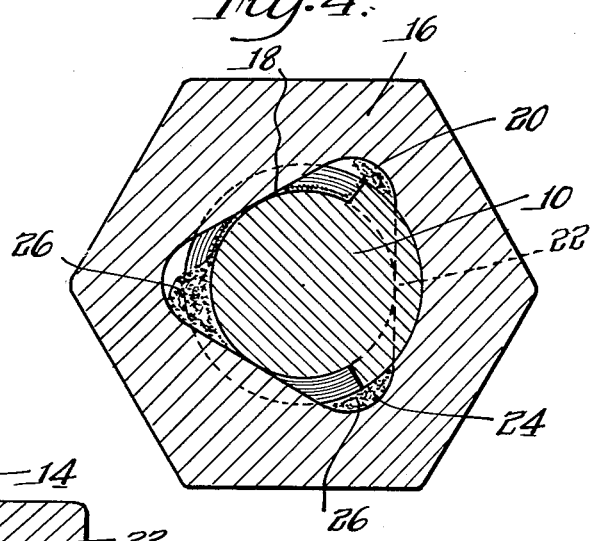
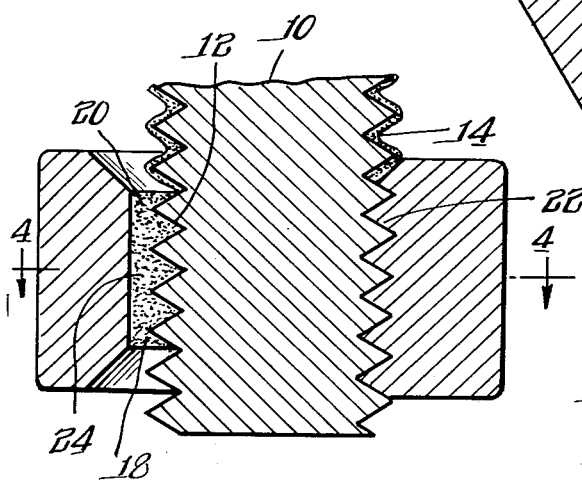
INVENTOR.
Henry A. Sygnator
BY.
Olson & Trexler
attys

United States Patent Office 2,983,180
Patented May 9, 1961

2,983,180
DIE NUT HAVING AN APERTURE SHAPED AS A REGULAR POLYGON

Henry A. Sygnator, Arlington Heights, Ill., assignor to Illinois Tool Works, Chicago, Ill., a corporation of Illinois Filed Aug. 7, 1957, Ser. No. 676,798

3 Claims. (Cl. 85—32)

This invention is concerned generally with a nut, and more particularly with a nut capable of chasing the threads on a stud fastener.

There are many instances in which it is necessary to chase the threads on a threaded stud fastener. For example, parts are often painted prior to shipping or storage, and paint gets into the threads of any threaded part such as studs. It is then very difficult to turn a nut onto the thread of the stud or other part. The nut forming the subject matter of this invention is capable of cleaning the paint from the threads of such a stud or the like and hence is readily turned on to a painted stud or the like, or any other item on which threads must be chased.

Accordingly, it is an object of this invention to provide a nut having lateral or radial cavities or recesses for receipt and clearance of paint or other material chased or removed from a stud or the like as the nut is threaded thereon.

More particularly, it is an object of this invention to provide a nut having an aperture therethrough in the form of a polygon and specifically an equilateral triangle, with arcuate threads formed in the flat sides thereof whereby the corners or apices are capable of receiving and clearing paint or other material scraped from a stud as the nut is threaded thereon.

Other and further objects and advantages of the present invention will be apparent from the following description when taken in connection with the accompanying drawings wherein:

Fig. 1 is a side view of a bolt having a nut threaded thereon, the nut being constructed in accordance with the principles of this invention;

Fig. 2 is a perspective view of the nut;

Fig. 3 is a longitudinal sectional view showing the nut as applied to the bolt and scraping paint from the threads thereof;

Fig. 4 is a cross-sectional view through the nut and bolt as taken along the line 4—4 of Fig. 3;

Fig. 5 is a modification of use of the nut, showing the nut as forming a thread on a relatively soft bolt or the like.

Referring now in greater particularlity to the drawings, and first to Figs. 1-4, there will be seen a bolt 10 having threads 12 thereon. As will be seen in Fig. 3, the bolt has been painted and has a coating of paint 14 extending into the threads, and thereby tending to inhibit the threading of an ordinary nut onto the bolt.

In accordance with the principles of this invention, a nut 16 is provided which readily can be threaded onto the painted bolt. The nut conveniently is of the usual external hexagonal shape, and internally the nut is provided with a "bore" in the shape of an equilateral triangle as at 18. The corners of the triangle are rounded off at 20, and the sides thereof are provided with partial threads at 22. The shape of the central bore 18 provides pockets 24 at the apices of the triangular shape.

Accordingly, when a nut is threaded onto the painted bolt, the partial threads 22 along the straight sides of the triangular bore scrape the paint 14 from the threads of the bolt and displace it as shavings of paint to the pockets 24 as is shown at 26. As will be apparent, the axial feed of the nut onto the bolt provides an axial component of force on the paint shavings 26, and hence the paint shavings are forced endwise from the nut once the pockets 24 have become substantially full.

As is shown in Fig. 5, the nut 16 also can be used to form threads on a relatively soft, initially threadless bolt 10a. The nut is simply turned onto the threadless bolt, and since the bolt is relatively softer than the nut, material is scraped therefrom as at 24a to form threads 12a on the bolt. The action is substantially the same as when paint is scraped from the bolt.

It will be understood that the triangular shape is of particular efficacy inasmuch as the pockets 24 formed thereby are relatively large. However, the pockets could be otherwise formed, and in some instances polygonal figures having more than three sides, and correspondingly having more than three pockets, may be found to be satisfactory. The important feature is that partial threads are formed in a nut, and lateral or radial pockets are provided in the bore for receiving material scraped or chased from a stud or the like, such material including paint or other coating material, or actually including part of the material of the stud, when the stud is initially unthreaded, and is relatively soft.

It is to be understood that the illustrative embodiment of the invention is for explanatory purposes only. Various changes in structure will no doubt occur to those skilled in the art, and are to be understood as forming a part of this invention in so far as they follow in the spirit and scope of the appended claims.

The invention is claimed as follows:

1. A solid, substantially radially rigid nut for forming finished threads on a complementary stud member or the like upon rotary telescopic association of the nut and such stud, said nut having the outer periphery thereof in the form of a hexagon and having an axial aperture therethrough with the center coincident with the center of the outer periphery of the nut, the peripheral wall defining said aperture being in the form of an equilateral triangle, threads formed in said walls positioned in substantial radial alignment with alternate corners of the nut periphery, the body of the nut adjacent the side walls of the aperture in which said threaded portions are positioned defining a strut-like triangular section for rigidly opposing the reaction forces resulting from the engagement of the nut threads with a complementary stud member, said side walls of the triangular aperture serving to effect maximum thread engagement with a minimum number of threaded side walls, the corners of said triangular aperture being in substantial radial alignment with the other alternate corners of the outer nut periphery, and the three corner areas of said nut aperture providing pockets for receiving material removed from the stud member or the like upon rotary telescopic association of said parts.

2. A solid, substantially radially rigid nut wherein the corners of the nut aperture are in the form of rounded surfaces.

3. A solid, substantially radially rigid nut wherein the entrance to the triangular opening is chamfered.

References Cited in the file of this patent

UNITED STATES PATENTS

| | | |
|---|---|---|
| 689,555 | Mann | Dec. 24, 1901 |
| 932,396 | Kenney | Aug. 24, 1909 |
| 1,465,337 | Benford | Aug. 21, 1923 |
| 1,545,884 | Coyne | July 14, 1925 |
| 2,561,036 | Sodders | July 17, 1951 |

FOREIGN PATENTS

| | | |
|---|---|---|
| 105,376 | Germany | Sept. 26, 1899 |